No. 644,684. Patented Mar. 6, 1900.
H. G. REIST.
DYNAMO ELECTRIC MACHINE.
(Application filed Oct. 27, 1899.)
(No Model.)
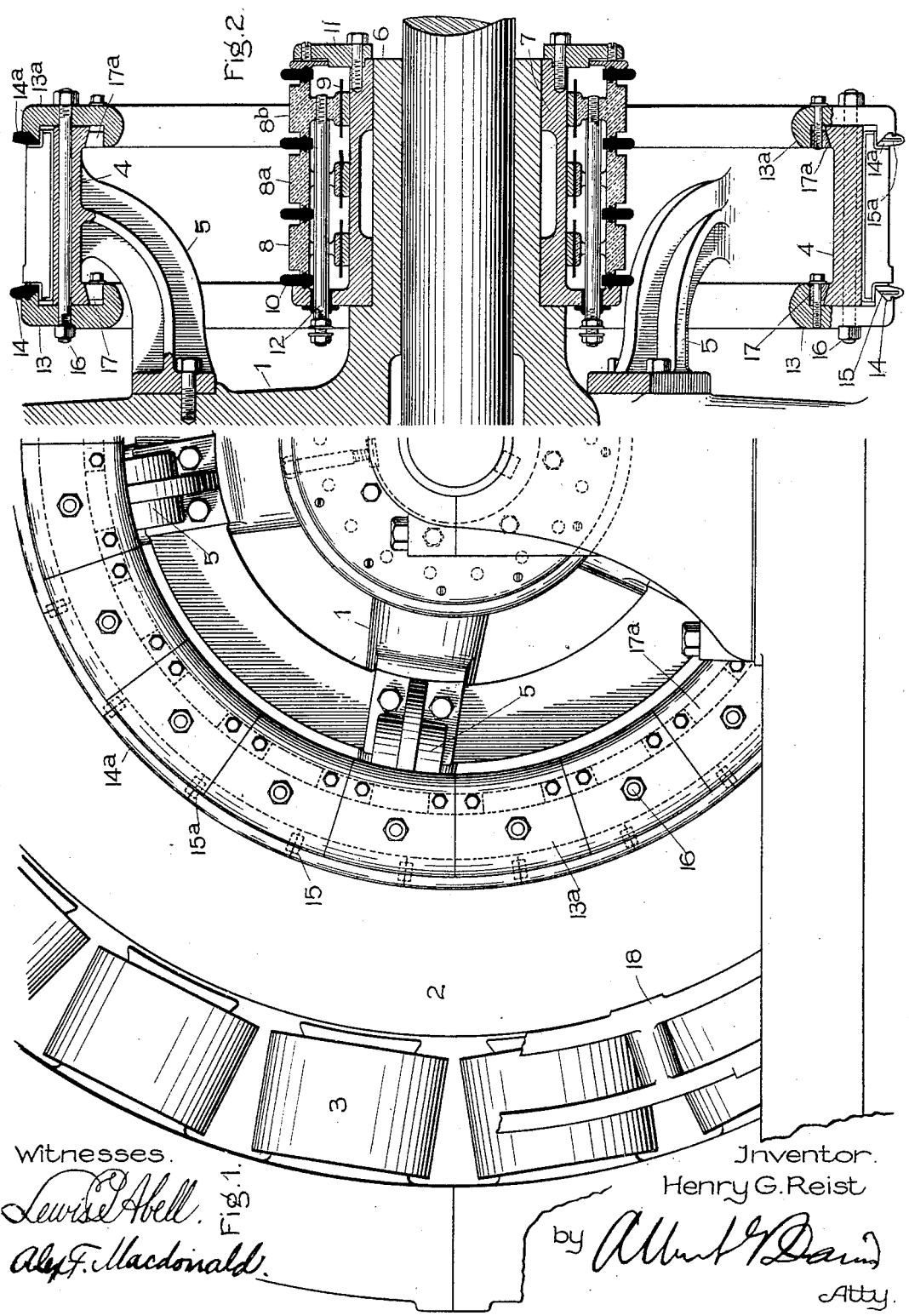
Witnesses.
Lewis Abell
Alex F. Macdonald
Inventor.
Henry G. Reist
by Albert G. Davis
Atty.

UNITED STATES PATENT OFFICE.

HENRY G. REIST, OF SCHENECTADY, NEW YORK, ASSIGNOR TO THE GENERAL ELECTRIC COMPANY, OF NEW YORK.

DYNAMO-ELECTRIC MACHINE.

SPECIFICATION forming part of Letters Patent No. 644,684, dated March 6, 1900.

Application filed October 27, 1899. Serial No. 734,914. (No model.)

*To all whom it may concern:*

Be it known that I, HENRY G. REIST, a citizen of the United States, residing at Schenectady, county of Schenectady, State of New York, have invented certain new and useful Improvements in Dynamo-Electric Machines, (Case No. 1,457,) of which the following is a specification.

This invention relates to dynamo-electric machines.

The object of my invention is to provide the commutator or current-collecting device with certain details of construction the novelty of which will be hereinafter more fully pointed out.

The novel features of my invention will be specifically indicated in the claims.

In the accompanying drawings, Figure 1 is an end elevation of a part of a machine embodying my improvements, and Fig. 2 is a sectional elevation of the commutator and collector end of a machine embodying my improvements.

I have shown in the drawings my invention as applied to a type of machine in which both the commutator and collector are used and which is particularly well suited for rotary converters in which the commutator is mounted upon the armature so as to overhang its hub and a collector is placed beneath the same, so as to save horizontal room by permitting the commutator and collector to nest one within the other. My invention is particularly applicable to such types of machines, in that it admits of the employment of a commutator of large diameter, for which my improvements are particularly well suited.

1 represents a spider upon which the core-plates of the armature (indicated at 2) may be mounted in any ordinary approved manner, and 3 represents the field-magnets. I secure to the spider, by a number of lag-bolts or otherwise, a casting, forming an annulus to support the commutator, as indicated at 4, provided with a plurality of arms 5, adapted to abut against the arms of the spider and be rigidly connected thereto by bolts, as indicated. The arms 5 suspend the commutator over the hub 6 of the spider, and in the space thus provided I may mount a collector for alternating currents. So far as my present invention is concerned this collector may be of any suitable type of construction. The form shown is fully described and claimed in a copending application, Serial No. 684,520, filed by me June 25, 1898, and its parts require only a general notice herein. It consists of a supporting-shell 7, upon which are mounted a plurality of collecting-rings 8 $8^a$ $8^b$, according to the number of phases of the alternating current, the rings being insulated from the supporting-shell by cylindrical septa, as 9, of mica or other insulating material. The collecting-rings are separated one from another by annular barriers, as 10, of insulating material, all of the parts being held against an inner flange of the shell by a clamping-ring 11, drawn firmly into place by set-screws, as indicated. From each collector-ring lead a plurality of metallic terminals 12, with which suitable connection may be made with the armature-winding in the ordinary manner.

Upon the annular support 4 for the commutator is applied a band of mica or other insulating material, and the commutator-bars are set thereon and clamped in place by a plurality of segmental plates 13 $13^a$, formed by sawing a complete ring-casting into a considerable number of segments. The outer edges of these plates overhang the commutator-bars and are notched or grooved to form a seat for a beading, as 14 $14^a$, of insulating material, such as indurated fiber, rising above the plane of the commutator-bars and that of the clamping-plates, and thus forming a barrier against leakage of current due to oil or dirt. This beading forms, when the parts are assembled, a ring, (indicated in dotted lines in Fig. 1,) the sections being connected by thin dowels of mica set in slots or sockets formed in the ends of the segments, as indicated at 15 $15^a$, &c. The connecting-plates prevent oil from oozing between the joints in the segments of the beading. The clamp-plates are drawn firmly up against the commutator-bars (the beading of course being interposed) by means of bolts 16, extending through the commutator-support, and the commutator-bars are drawn down firmly against the support by a plurality of wedges 17 $17^a$, lagged or bolted to the clamp-plates, one such wedge being preferably employed at each joint between two adjacent clamp-plates. Thus when the commutator-bars and clamp-plates are assembled the wedges 17 17ᵃ are screwed home and bring the commutator-bars firmly against its support. The coöperating faces of the support and clamp-plates may be of any suitable conformation to coöperate with the wedges. As shown, the inner edges of the support are beveled, and the clamp-plates are provided with an overhanging right-angled flange, against which the wedges bear when being bolted home.

An organization of the kind herein described is particularly advantageous when high-potential direct currents are generated or absorbed in the machine, since the large diameter of the commutator admits of the employment of a large number of segments with a correspondingly-low potential between adjacent segments. By the form of construction of the commutator-support I derive the additional advantage of affording room for the collector beneath the commutator, so as to reduce the horizontal space occupied by the armature.

While I have described the improvements as especially applicable to commutators, parts may also with advantage be applied to current-collectors of other types—as, for example, the segmental beading rising above the plane of the brush-contact with the commutator.

The other parts of the machine illustrated in the drawings may be of any ordinary construction and require no further explanation.

18 represents the brush-holding ring. As this, however, forms no part of my invention and is of well-known construction, no detailed description or illustration is deemed necessary.

Within the term "dynamo-electric machine" as employed herein I include either generators or motors, as it will be obvious that my invention is applicable to either and may be employed whether the machine be designed simply to generate or absorb a direct or alternating current, or both, or to absorb one and generate the other.

What I claim as new, and desire to secure by Letters Patent of the United States, is—

1. A current-collecting device for a dynamo-electric machine having at its sides annular barriers of insulating material rising above the plane of the brush-contacts and formed of a plurality of independent segments.

2. A commutator for a dynamo-electric machine, comprising an annular support, an annular range of clamp-plates overlapping the ends of the commutator-bars, and an annular beading of insulating material locked in place by the clamp-plates and rising above the plane of the commutator-bars.

3. A commutator for a dynamo-electric machine, comprising an annular support, a circular range of commutator-bars thereon, a circular range of segmental clamp-plates overlapping the ends of the bars, and a circular range of insulating-strips locked between the clamp-plates and commutator-bars and rising above the plane of the commutator-bars.

4. A commutator for a dynamo electric machine, comprising an annular support, a circular range of commutator-bars thereon, a circular range of clamp-plates at the ends of the bars, annular insulating-barriers between the bars and the clamp-plates, and means for preventing leakage between the commutator-bars and the clamp-plates at the joints of the barrier-segments.

5. A commutator for a dynamo-electric machine, comprising an annular support, clamp-plates for the commutator-bars and an insulating-beading between the clamp-plates and the bars, formed of a ring of segments connected at the joints by insulating-dowels.

In witness whereof I have hereunto set my hand this 25th day of October, 1899.

HENRY G. REIST.

Witnesses:
BENJAMIN B. HULL,
MABEL E. JACOBSON.